United States Patent
Wood et al.

(10) Patent No.: US 7,400,917 B2
(45) Date of Patent: Jul. 15, 2008

(54) PROTECTIVE DEVICES FOR A MOBILE TERMINAL

(75) Inventors: Joseph Wood, Burlington, MA (US); Valtteri Eroma, Helsinki (FI); Jamie Yung, Hong Kong (CN); Dicky Wong, Hong Kong (CN)

(73) Assignee: Nokia Corporation, Espoo (FI)

( * ) Notice: Subject to any disclaimer, the term of this patent is extended or adjusted under 35 U.S.C. 154(b) by 553 days.

(21) Appl. No.: 11/046,556

(22) Filed: Jan. 28, 2005

(65) Prior Publication Data

US 2005/0181745 A1 Aug. 18, 2005

Related U.S. Application Data

(60) Provisional application No. 60/540,899, filed on Jan. 30, 2004.

(51) Int. Cl.
*H04B 1/38* (2006.01)
(52) U.S. Cl. .............. 455/575.8; 455/575.1; 455/575.3; 455/575.4
(58) Field of Classification Search .............. 455/575.8, 455/556.1, 575.1, 90.3, 575.3, 575.4
See application file for complete search history.

(56) References Cited

U.S. PATENT DOCUMENTS

| | | | | |
|---|---|---|---|---|
| 5,586,168 A * | 12/1996 | Bucalo et al. | ............ | 455/575.1 |
| 6,201,867 B1 * | 3/2001 | Koike | ............ | 379/433.11 |
| 6,445,577 B1 * | 9/2002 | Madsen et al. | ............ | 361/683 |
| 6,456,487 B1 | 9/2002 | Hetterick | | |
| 6,785,566 B1 * | 8/2004 | Irizarry | ............ | 455/575.8 |
| 7,230,823 B2 * | 6/2007 | Richardson et al. | ......... | 361/683 |
| 2003/0184958 A1 * | 10/2003 | Kao | ............ | 361/683 |
| 2005/0018419 A1 * | 1/2005 | Parsons | ............ | 362/116 |
| 2006/0105722 A1 * | 5/2006 | Kumar | ............ | 455/90.3 |

FOREIGN PATENT DOCUMENTS

JP 11-233964 * 8/1999

* cited by examiner

*Primary Examiner*—Matthew Anderson
*Assistant Examiner*—Tuan A Pham
(74) *Attorney, Agent, or Firm*—Ware, Fressola, Van Der Sluys & Adolphson, LLP

(57) ABSTRACT

This invention describes a protective device and associated method for protecting (including the protection from water and dust) a mobile terminal whether or not the terminal is in use, and for providing a hands-free operation of the mobile terminal, wherein the mobile terminal can be a mobile phone, a personal digital assistant (PDA), a pager, a MP3 player, or any similar portable communication device or a mobile electronic device.

6 Claims, 11 Drawing Sheets

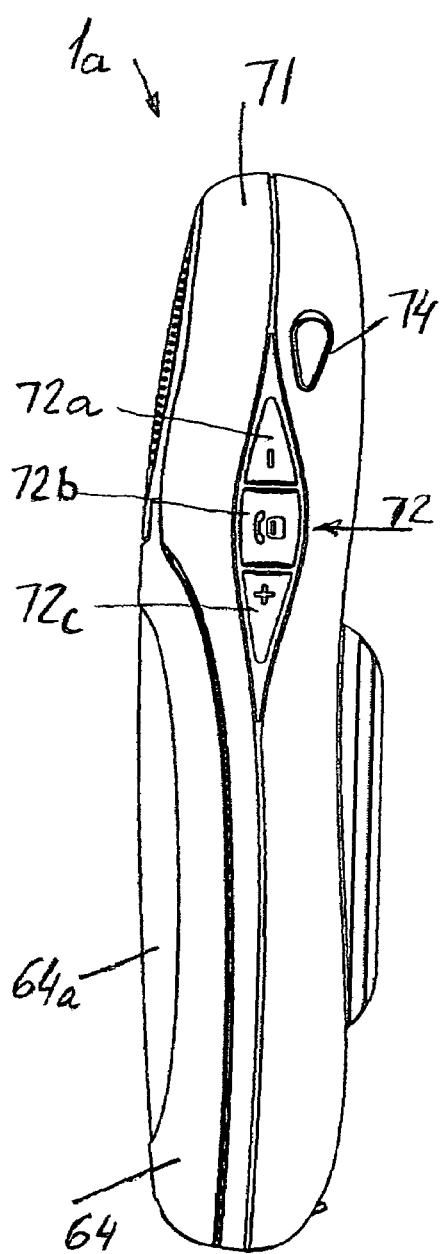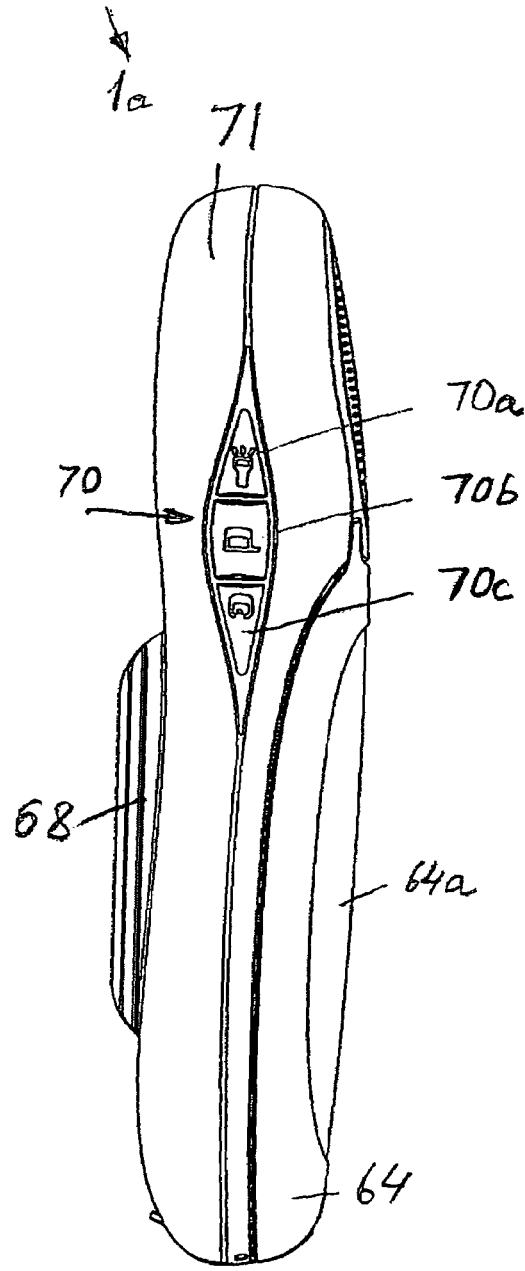
Figure 8
Figure 9

PROTECTIVE DEVICES FOR A MOBILE TERMINAL

CROSS-REFERENCE TO RELATED APPLICATION

This application claims priority from U.S. Provisional Patent Application Ser. No. 60/540,899, filed Jan. 30, 2004 and from U.S. patent application Ser. No. 10/881,898 filed on Jun. 30, 2004.

FIELD OF THE INVENTION

The present invention relates to protective enclosures for mobile terminals (e.g., mobile phones), and more specifically to protective devices for mobile terminals that allow using the mobile terminals while they are protected within the sealed enclosure of the protective device including the protection from water and dust.

BACKGROUND ART

Wireless communication has advanced significantly over the past few decades. Today, mobile terminals (such as mobile phones, pagers, personal digital assistants, and similar devices) play an important role in society. An increasingly large percentage of the population carries some sort of mobile terminal. People of all ages and walks of life use these mobile terminals to communicate, access the internet, play games, store information, and organize their calendars. People often rely on having easy access to their mobile terminals at all times.

One of the most important characteristics of a mobile terminal is its portability. Consumers constantly demand smaller and lighter mobile terminals that are easier to carry around on a day-to-day basis. In response to consumer demand, today's mobile terminals are often designed to be easily carried in a pocket or handbag or attached to a belt. To achieve smaller sizes and weights, today's mobile devices often lack any kind of significant protection from the elements. Most of the mobile terminals today are highly susceptible to water, dust, and dirt, and few have any significant shock protection.

As consumers increasingly rely on their mobile terminals, they desire to take their mobile terminals everywhere they go and have access to them at any time of day. As a result, today's mobile devices are frequently used in environments hostile to the mobile terminal's electronics. For example, a person who takes a cell phone, PDA, or similar device, to the beach risks harming the device by getting the device sandy or wet. Likewise, someone who works outdoors and is exposed to the elements may desire to have a mobile terminal that is water, dirt, and shock resistant. Even, sitting by the pool or on a boat talking on a mobile phone could be disastrous if the phone is splashed or accidentally dropped in the water. Countless other situations exist, like jogging, hiking, camping, or attending sporting events, where a person may desire to have their mobile device handy but at the same time may not wish to risk exposing the device to potentially harmful environments.

Since a mobile terminal is often a significant investment for the user and would, at the least, be inconvenient to replace, a means of adequately protecting the terminal is needed. Typical protective cases that are currently available consist of flexible leather or plastic jackets that fit snuggly over the terminal. In order for the mobile terminal to be useable with these protective covers in place, these covers generally have cutouts that expose the input and output components of the terminal, such as the keypads, speakers, and microphones. As a result, such covers provide little protection from water, sand, and dirt, and provide almost no added shock protection if the terminal is dropped.

Hard plastic cases that exist in the art, such as that described by U.S. Pat. No. 6,456,487, are generally not waterproof and may require covers to be sealed against the elements. Also, some cases require that the terminal be removed from the case prior to use. Similarly, a person could wrap their terminal in a waterproof plastic bag, but again this would require removal of the terminal prior to use. As a result, cases that require the terminal to be removed for use provide no protection to the terminal during use, when the terminal is often most vulnerable.

Wireless headsets can be used to access a mobile phone while the phone is stored in a secure location. These headsets generally communicate with the mobile terminal using BLUETOOTH wireless technology. BLUETOOTH wireless technology enables cable-free connections by using radio frequency signals to communicate with the mobile terminal. For the headsets to work, the mobile terminal must be in close proximity to the headset. As a result, the mobile terminal must typically be with the user anyway and, therefore, will still need some means of protection. The small size of the headset limits the input, output, and power components that can be placed on the headset. Furthermore, a person using a headset with a mobile phone while the phone is protected in a handbag or backpack cannot see the display on the phone. To see the phone, the person would have to take it out of the bag, thus exposing it to the harsh environment from which the person was protecting it. Finally, these headsets are not waterproof themselves.

Accordingly, a device is needed that allows consumers the ability to use their small, lightweight, mobile terminals in all kinds of environments without worrying about harming or destroying the terminal. Ideally, the protective device should be waterproof, buoyant, and able to absorb the shock associated with dropping the mobile terminal. At the same time, it would be beneficial to be able to easily use a mobile device and enjoy much of its rich functionality while it is protected.

The mobile telephone is the most commonly used mobile terminal. Mobile telephones are in every day use in many different settings including home, automobiles, bicycles, carried on the person in pocket, and in various recreational activities, many of which are outdoors. Some of these outdoor activities can involve proximity to the beach and other water-related activities such as boating, water skiing, etc. Other outdoor activities may involve proximity to dirt and dust and from which it may be desirable to protect one's mobile phone. It is also desirable in some outdoor activities to be able to carry the mobile phone on the person without having to use one's hands so that operation may be conducted in a "hands-free" manner. Mobile phones are now equipped with many different functionalities and may include functions beyond simple voice telephony. Such may include music downloads, radio, multimedia messaging, etc. It would be desirable to have a means for protecting a mobile phone in harsh outdoor environments while still being able to use the phone in a hand-free manner and utilize many of the new functionalities besides voice telephony.

DISCLOSURE OF THE INVENTION

The object of the present invention is to provide a protective device and associated method, for environmentally protecting (including the protection from water and dust) a mobile terminal whether or not the terminal is in use, and to provide a hands-free operation of the mobile terminal, wherein the mobile terminal can be a mobile phone, a personal digital assistant (PDA), a pager, a MP3 player, or any similar portable communication device or a mobile electronic device.

According to a first aspect of the invention, a protective device for encapsulating a mobile terminal, comprises: a housing adapted to define an opened position for receiving a mobile terminal and further adapted to define a closed position for securing the mobile terminal therein, the housing comprised at least partially of a waterproof material and being sealed in the closed position so as to protect the mobile terminal from an incursion of water and dust; at least one of: an input component carried by the housing for receiving user input from a user of the mobile terminal and an output component carried by the housing for providing output to the user; and a signal processor carried by the housing for converting at least one of: (i) the input received by the input component to at least one signal that the mobile terminal is capable of processing prior to provision of the at least one signal to the mobile terminal, and (ii) at least one further signal received from the mobile terminal to at least one additional signal that the output component is capable of processing prior to presentation to the output component for providing the output to the user.

According further to the first aspect of the invention, the signal processor may be capable of transmitting radio frequency signals to the mobile terminal and the signal processor may be further capable of receiving radio frequency signals from the mobile terminal.

Further according to the first aspect of the invention, the protective device may further comprise an electrical connection between the signal processor and the mobile terminal, the electrical connection may be capable of transmitting signals from the signal processor to the mobile terminal and from the mobile terminal to the signal processor.

Still further according to the first aspect of the invention, the input component may comprise of at least one of a microphone and a keypad having at least one key.

According further to the first aspect of the invention, the output component may comprise of at least one of a speaker and a visual display.

According still further to the first aspect of the invention, the protective device may comprise: a fastener for securing the mobile terminal within the protective device, wherein optionally the fastener may comprise of at least one strap for at least partially encircling the mobile terminal.

According further still to the first aspect of the invention, the housing may comprise of at least two portions mechanically coupled to each other and, when in the closed position, the two portions may be firmly secured relative to each other.

According yet further still to the first aspect of the invention, the housing may comprise of all waterproof materials and further may comprise at least one gasket between the portions of the housing to create a hermetic seal and secure a waterproof operation in the closed position.

Yet still further according to the first aspect of the invention, the housing may be at least partially comprised of an at least partially transparent material.

Still yet further according to the first aspect of the invention, the protective device may comprise: a power supply carried by the housing for providing power to the input/output component and signal processor.

Still further still according to the first aspect of the invention, the protective device may further comprise: a strap attached to the housing to aid in the carrying of the protective device.

Further according to the first aspect of the invention, the input and output components and the signal processor may be removable from the housing while still being capable of communicating with the mobile terminal. Still further, the input component, the output component and the processor may form a headset, and wherein transmitting signals between the headset and the mobile terminal may comprise transmitting radio frequency signals between the headset and the mobile terminal or wherein transmitting signals between the headset and the mobile terminal may comprise transmitting electrical signals between the headset and the mobile terminal.

According still further to the first aspect of the invention, the input component may be a microphone and the output component may be a speaker to provide a hands-free operation of the terminal device.

According further still to the first aspect of the invention, the housing may be buoyant with the mobile terminal secured therein while in the closed position.

According yet further still to the first aspect of the invention, at least one operational function of the mobile terminal inserted into the protective device may be actuated using at least one corresponding button or at least one corresponding key of the protective device.

According to a second aspect of the invention, a mobile terminal assembly comprises: a mobile terminal; and a protective device in which the mobile terminal is removably disposed; the protective device comprises: a housing adapted to define an opened position for receiving a mobile terminal and further adapted to define a closed position for securing the mobile terminal therein, the housing comprised at least partially of a waterproof material and being sealed in the closed position so as to protect the mobile terminal from an incursion of water and dust; at least one of: an input component carried by the housing for receiving user input from a user of the mobile terminal and an output component carried by the housing for providing output to the user; and a signal processor carried by the housing for converting at least one of: (i) the input received by the input component to at least one signal that the mobile terminal is capable of processing prior to provision of the at least one signal to the mobile terminal, and (ii) at least one further signal received from the mobile terminal to at least one additional signal that the output component is capable of processing prior to presentation to the output component for providing the output to the user.

According to a third aspect of the invention, a method for using a protective device with a mobile terminal, comprises the steps of: securing the mobile terminal with a housing of the protective device; receiving input from a user of the mobile terminal by an input component carried by the housing or providing output to the user by an output component carried by the housing; and converting by a signal processor carried by the housing at least one of: (i) the input received by the input component to at least one signal that the mobile terminal is capable of processing prior to provision of the at least one signal to the mobile terminal, and (ii) at least one further signal received from the mobile terminal to at least one additional signal that the output component is capable of processing prior to presentation to the output component for providing the output to the user.

According further to the third aspect of the invention, the signal processor may be capable of transmitting radio frequency signals to the mobile terminal and the signal processor may be further capable of receiving radio frequency signals from the mobile terminal.

Further according to the third aspect of the invention, there may be an electrical connection between the signal processor and the mobile terminal, the electrical connection being capable of transmitting signals from the signal processor to the mobile terminal and from the mobile terminal to the signal processor.

Still further according to the third aspect of the invention, the protective device may further comprise: a fastener for securing the mobile terminal within the protective device, wherein optionally the fastener may comprise of at least one strap for at least partially encircling the mobile terminal.

According further to the third aspect of the invention, the housing may be comprised of at least two portions mechanically coupled to each other and, when in the closed position, the two portions may be firmly secured relative to each other.

According still further to the third aspect of the invention, the housing may comprise of all waterproof materials and further may comprise at least one gasket between the portions of the housing to create a hermetic seal and secure a waterproof operation in the closed position.

According yet further still to the third aspect of the invention, the housing may be at least partially comprised of an at least partially transparent material.

According further still to the third aspect of the invention, the protective device may further comprise: a power supply carried by the housing for providing power to the input/output component and signal processor.

Yet still further according to the third aspect of the invention, the input and output components and the signal processor may be removable from the housing while still being capable of communicating with the mobile terminal.

Still yet further according to the third aspect of the invention, the input component, the output component and the processor may form a headset, and wherein transmitting signals between the headset and the mobile terminal may comprise transmitting radio frequency signals between the headset and the mobile terminal or wherein transmitting signals between the headset and the mobile terminal may comprise transmitting electrical signals between the headset and the mobile terminal. Further, the invention may further comprise the step of: removing the mobile terminal and the headset from the housing such that the mobile terminal and the headset are capable of subsequently being utilized apart from the housing.

According to a fourth aspect of the invention, a protective device for use with a mobile phone, comprises: a housing for a mobile phone within which the mobile phone is insertable and protected against water splash and dust when the housing is in a closed position; and a microphone and a speaker built-in to the housing to enable hands-free operation of the mobile phone when inserted in the housing.

According further to the fourth aspect of the invention, the housing may have a transparent window and at least one key of the mobile phone inserted into the protective device may be actuated by a user of the mobile phone by pressing the at least one key through the transparent window.

Further according to the fourth aspect of the invention, the mobile phone inserted into the protective device may be electrically charged using a corresponding jack port of the protective device without interrupting a normal operation of the mobile phone.

Still further according to the fourth aspect of the invention, at least one operational function of the mobile phone inserted into the protective device may be actuated using at least one corresponding button or at least one key of the protective device.

According further to the fourth aspect of the invention, the protective device may have a build-in flashlight.

According still further to the fourth aspect of the invention, the mobile phone inserted into the protective device may be connected to the protective device using a corresponding electrical connector.

According further still to the fourth aspect of the invention, the mobile phone inserted into the protective device may be switched using the protective device between a hands-free operation utilizing the speaker of the protective device and a privacy mode with a reduced auto gain of the speaker.

BRIEF DESCRIPTION OF THE DRAWINGS

For a better understanding of the nature and objects of the present invention, reference is made to the following detailed description taken in conjunction with the following drawings, in which:

FIG. 8 is a side view of the device of FIGS. 6 and 7, according to the present invention;

FIG. 9 is another side view of the device of FIGS. 6 and 7, according to the present invention;

BEST MODE FOR CARRYING OUT THE INVENTION

The present invention provides a protective device, a mobile terminal assembly, and associated method for protecting (including the protection from water and dust) a mobile terminal whether or not the terminal is in use, and for providing a hands-free operation of the mobile terminal, wherein the mobile terminal can be a mobile phone, a personal digital assistant (PDA), a pager, a MP3 player, or any similar portable communication device or a mobile electronic device.

The present invention is directed to a protective device designed to protect a mobile terminal therein. The protective device comprises a housing adapted to define an opened position for receiving a mobile terminal and a closed position for securing the mobile terminal therein. Advantageously, the housing is preferably formed of a waterproof material and is sealed in the closed position so as to protect the mobile terminal from the incursion of water or other environmental contaminants. The housing may carry input component(s), such as a microphone and/or keypad, for receiving user input (or the input from a user of said protective device). The housing also carries a signal processor which converts the user input received by the input components to signals that the mobile terminal is capable of processing. Similarly, the housing may carry output component(s), such as a speaker, for providing user output (or the output to the user of said protective device). The signal processor converts signals received from the mobile terminal to signals that the output component is capable of processing.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
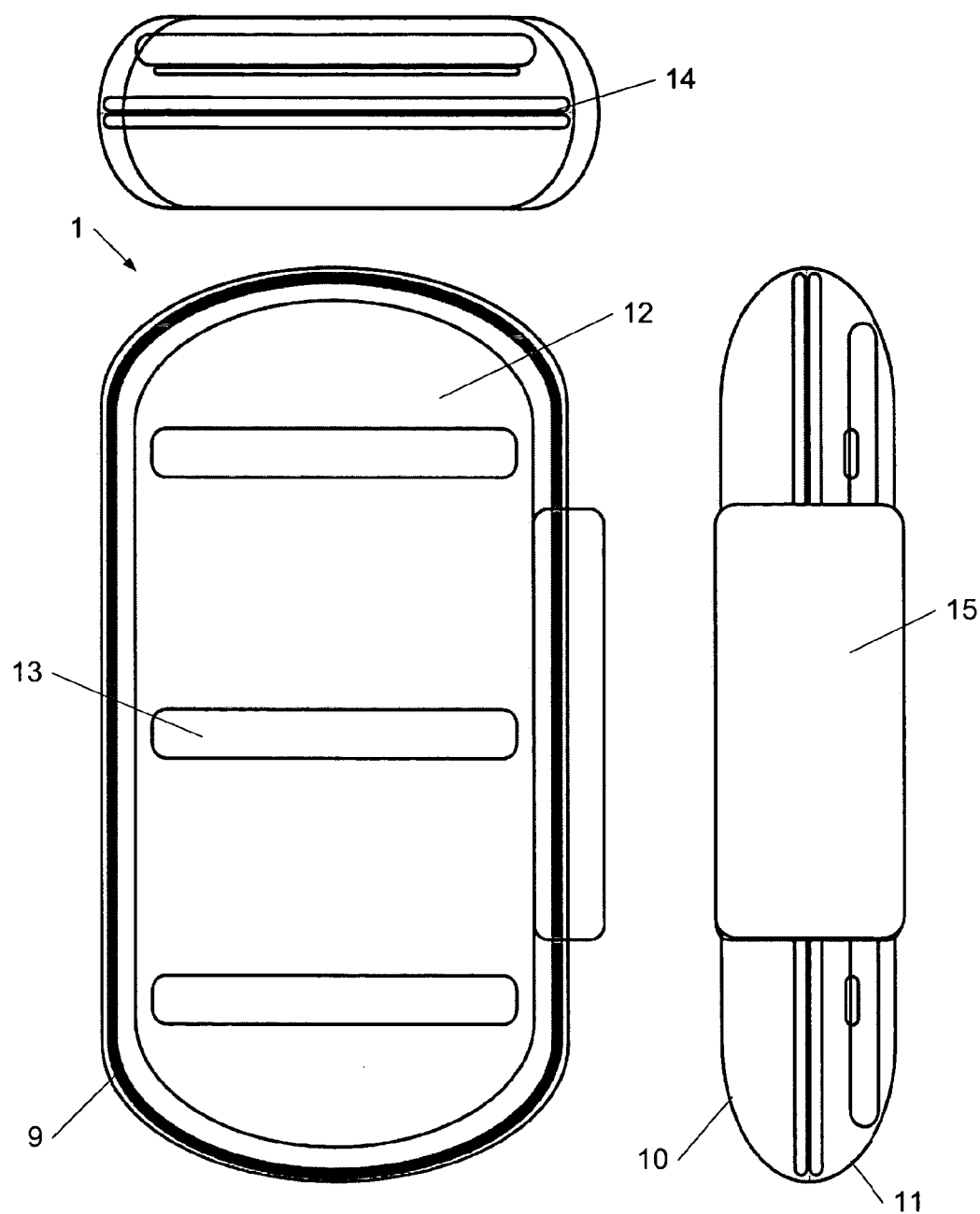
FIG. 1 is a three-view diagram of the exterior of a protective device, according to the present invention.
Figure 2:
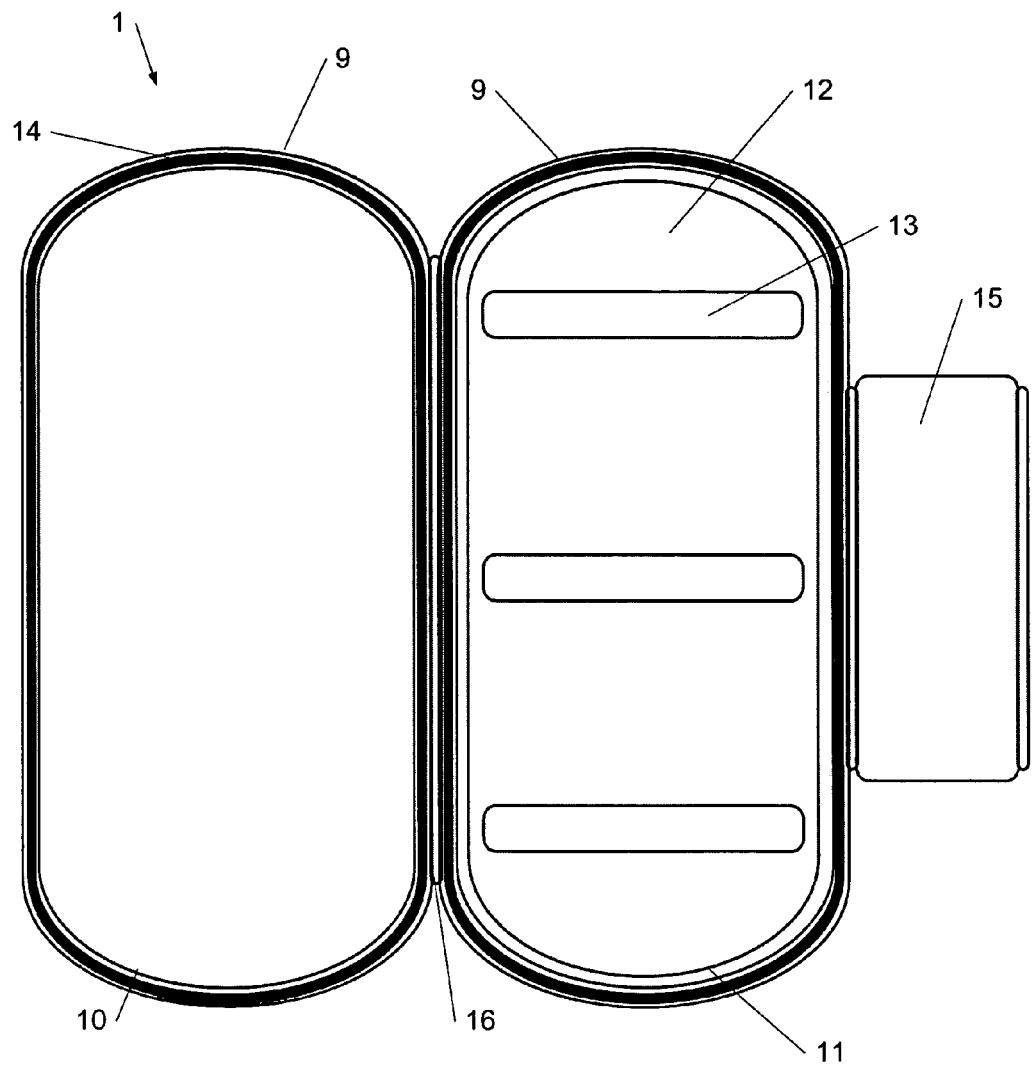
FIG. 2 is a diagram of the opened protective device, according to the present invention.

Referring now to FIGS. 1 and 2, an exemplary embodiment (among other possible scenarios) of a mobile terminal protective case (also called here a "protective device") 1 is shown. FIG. 1 shows three views of the protective device 1: the front plan view, top, and side views. FIG. 2 shows a view of the basic protective device 1 in the opened position ready to receive the mobile terminal. As shown, the protective device 1 includes a housing 9 designed to house a mobile terminal therein. The housing 9 may be made of any suitable material. In one embodiment, the housing is comprised of a substantially rigid material to physically protect the mobile terminal from an impact, such as if the protective device 1 is dropped. In addition, the housing may be formed of a waterproof material to protect the mobile terminal from water and other liquids. Moreover, the housing may be formed of a material that is buoyant so as to aid in the floatation of the protective device 1, even with the mobile terminal secured therein. As such, the mobile terminal may be protected from damage otherwise attributable to moisture or other contaminants while in the protective device 1. In one embodiment, for example, the housing is formed of a polycarbonate material.

The material that forms the housing, such as polycarbonate, may be selected to be at least partially transparent to enable the user to view the mobile terminal and any display of the mobile terminal while it is secured within the housing. It should be understood, however, that the housing 9 does not have to be made of a polycarbonate material, nor does the protective device 1 have to be clear. The protective device 1 could be partially transparent so that only portions of the mobile terminal or the interior components of the protective device 1 are visible from the outside. For example, the housing could provide a window through which the mobile terminal's display can be seen. Such a design may be desirable if the protective device 1 is to carry a decorative design or if the protective device 1 is designed to be a reflective color to protect the mobile terminal from the sun. Alternatively, for some uses or mobile terminals, the housing may not be transparent at all and is opaque instead.

The housing may be comprised of at least two portions. In the embodiment shown in FIGS. 1 and 2, for example, the housing 9 is comprised of two portions 10 and 11. In this embodiment, the two portions 10 and 11 are connected by a hinge coupling 16 that allows the housing to be opened to receive the mobile terminal and closed to secure the terminal therein. The hinge coupling 16 could be a separate hinge coupling the portions of the housing together, or, alternatively, the hinge coupling 16 could be integral with the portions themselves. A latch 15 may secure the housing in a closed position. It should be understood, however, that the housing 9 could be comprised of a single portion or any number of multiple portions. Likewise, the portions need not be joined and secured using a hinge and latch system. For example, the portions could slide together, latch together, or could simply be held together using a strap or rubber band.

The embodiment of the protective device 1 shown further comprises a backing 12 and a fastener, such as one or more straps 13, for securing the mobile terminal within the housing 9. In the preferred embodiment, the backing comprises soft foam and is applied to the interior of the back portion 11 of the housing. While three straps 13 are shown in the FIGS. 1 and 2, any number of straps could be used to secure the mobile terminal within the protective device 1. In alternative embodiments, straps may not be used at all. For example, the mobile terminal could be secured within the protective device 1 using Velcro, tape, latches, screws, buttons, elastic bands, or any similar fastening device. In yet another embodiment, the foam backing 12 could be designed so that the mobile terminal fits snuggly within a cutout in the foam. In such a case fasteners 13 may not be necessary.

The embodiment of the protective device 1 shown in FIGS. 1 and 2 further comprises a gasket 14, typically formed of rubber, that lines the rims of one or both of the portions 10 and 11 of the housing. When the housing is in a closed position, the gaskets 14 provide a seal capable of preventing liquid, dust, dirt, and sand from getting inside the protective device 1, thereby protecting the mobile terminal. In one embodiment, the protective device 1 is designed to be buoyant and to float with the mobile terminal secured within. This buoyancy is primarily achieved by selecting a relatively lightweight material, such as polycarbonate, to form the housing and sealing the housing in an airtight manner by means of the gasket. Thus, even if dropped in water, the protective device 1 carrying the mobile terminal can be recovered without damaging the mobile terminal.

Although not shown in the figures, alternative embodiments of the protective device 1 would have components designed to aid in the carrying of the protective device 1. In one embodiment, the protective device 1 would have a loop formed into the housing to allow a line, cord, carabineer, or similar item to be attached to the protective device 1 for securing it to other items, such as a wrist, belt, bag, or chair. Alternative embodiments may have belt loops, clips, or other fasteners attached to or formed in the housing.

Figure 3:
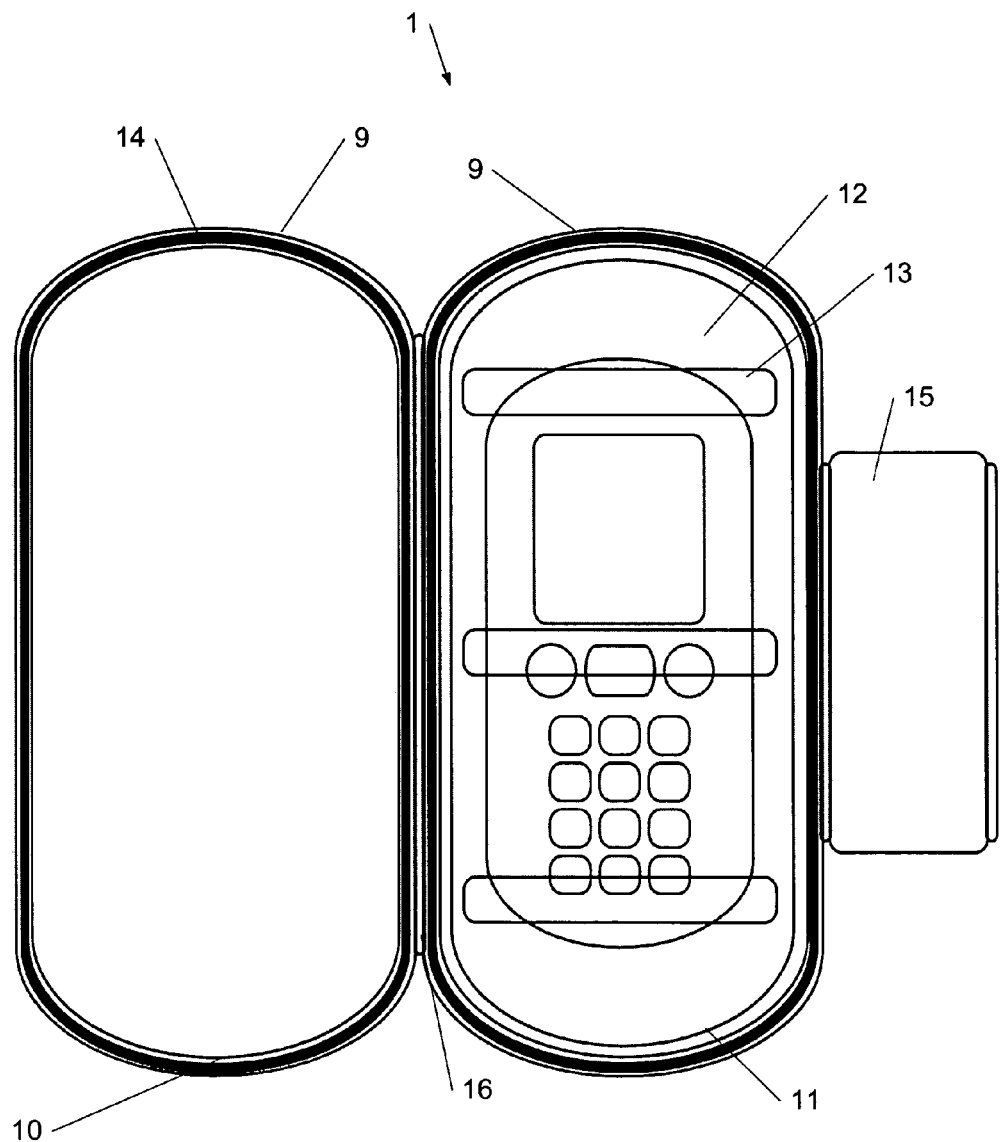
FIG. 3 is a diagram of an opened protective device with a mobile terminal secured therein, according to the present invention.

FIG. 3 shows an embodiment of a mobile terminal assembly, with the case (or protective device) 1 in an opened position with the mobile terminal 20 secured to the backing 12 using straps 13. Although the figure depicts a mobile phone secured in the protective device 1, the mobile terminal could alternatively be a pager, PDA, portable MP3 player, or similar portable electronic device. It should also be noted that the case 1 could be designed and manufactured in a single one-size-fits-all form, in several sizes (e.g., small, medium, large), or custom fit for the particular model of mobile terminal.

Figure 4:
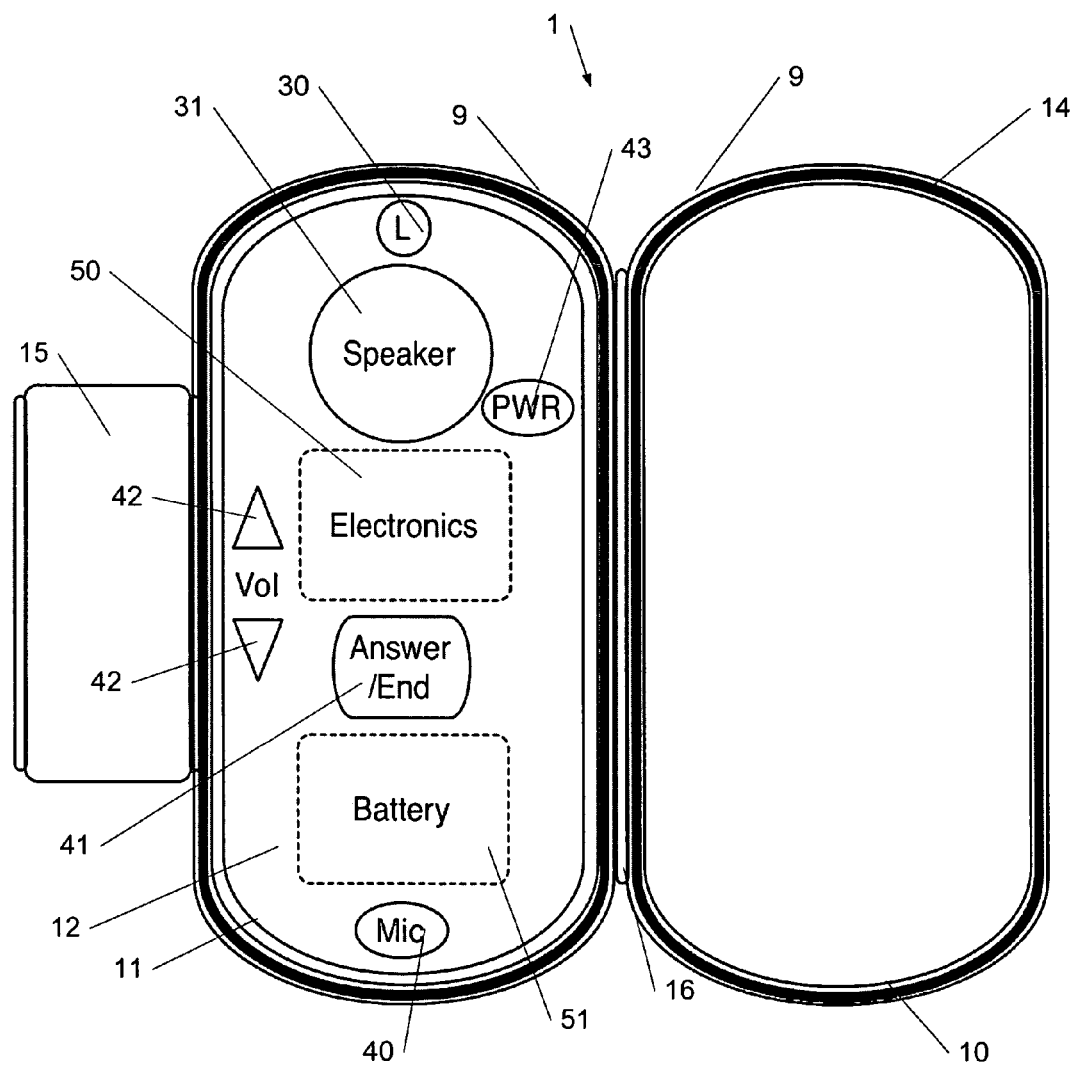
FIG. 4 is a diagram of the back view of an opened protective device showing the electronic, input, and output components of the case, according to the present invention.
Figure 5:
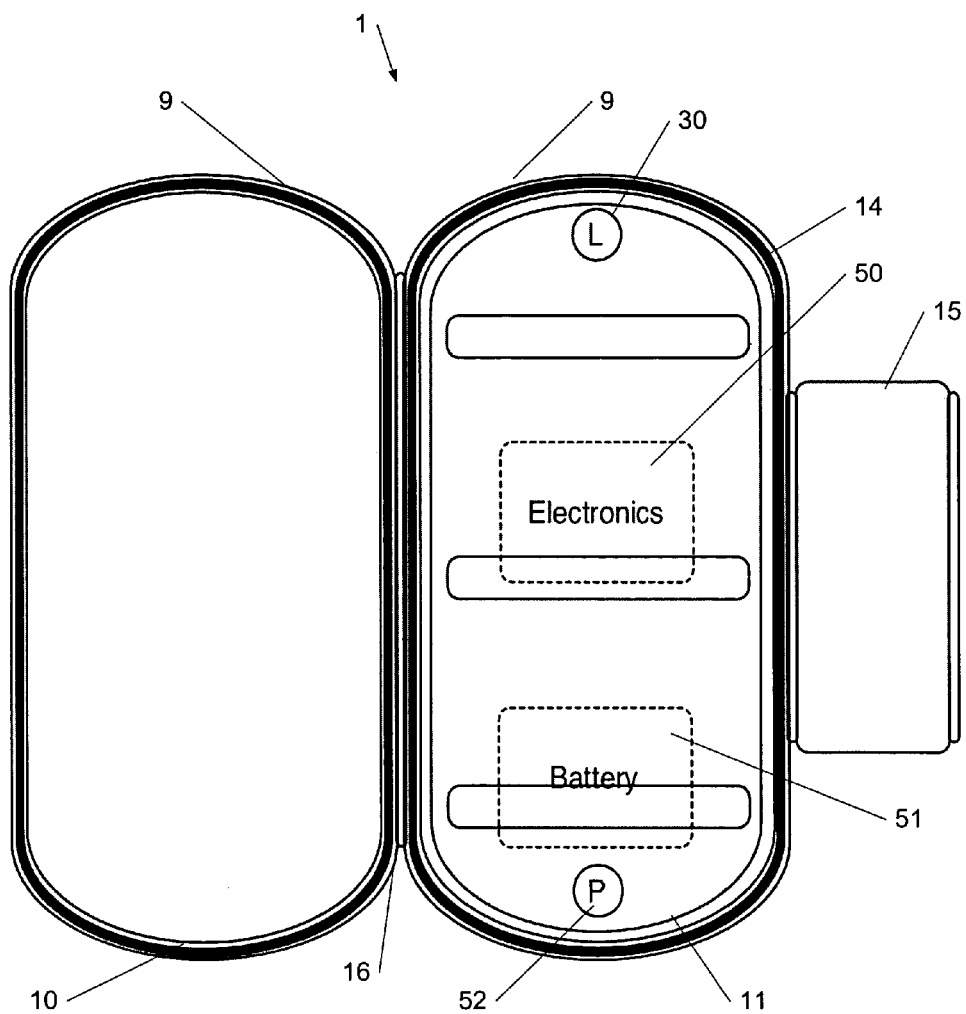
FIG. 5 is a diagram of the front view of the case without the mobile terminal showing electronic, input, and output components of the protective device, according to the present invention.

Referring now to FIGS. 4 and 5, an exemplary embodiment of the input, output, and electronic components of the protective device 1 is shown. It is noted that, as used herein, input/output components refers to any one or more of the input components and/or any one or more of the output components. FIG. 4 shows the back view of case (protective device) 1 in an opened position. FIG. 5 shows the front view of case (protective device) 1 in the opened position. Typically, most of the input, output, and electronic components of the protective device 1 are carried by the back portion 11 of the protective device 1 so that the front portion 10 of the protective device 1 is kept clear for viewing the mobile terminal and its display in embodiments in which the front portion of the protective device 1 is at least partially transparent. The embodiment shown by the figures is designed for a mobile phone, and therefore the input and output components correspond to some or all of the input and output components of the mobile phone secured therein. The placement, orientation, size, and selection of the components are for illustrative purposes only. The protective device 1 could be designed and manufactured to contain any number and type of input and output components in any arrangement. For example, other types of input/output components not shown in the figures may include LCDs, touch-screen displays, or devices designed to vibrate the protective device 1. Preferably the selection and positioning of input and output components is tailored to the type of mobile terminal to be secured within the protective device 1.

The input components of the embodiment shown by FIG. 4 are comprised of a microphone 40, an answer/end key 41, volume keys 42, and a power key 43. The output components are comprised of LED 30, and speaker 31. In this embodiment, the speaker 31 and the microphone 40 allow a conversation to take place. In some embodiments the speaker may be substantially larger than the mobile terminal's speaker to allow the speaker volume to be audible in a noisy environment. If the mobile terminal is capable of receiving voice commands, such as voice dialing, then the microphone 40 can be used for those purposes also. In the shown embodiment, the answer/end key 41 allows the user to answer, hang up, or use voice dialing to place a call. The LEDs 30 provide visual output to the user. For example, the LED may show the state of the connection between the case electronics and the mobile terminal secured therein. An LED may also display an incoming call, missed call, or voicemail message by, for example, blinking brightly.

The input/output components generally extend through and are accessible via corresponding apertures defined by the housing 9, such as the back portion of the housing 11. To protect the mobile terminal from the incursion of water and other contaminants, gaskets may also line the apertures defined by the housing so as to form a waterproof seal with the input/output component disposed therein. Additionally or alternatively, the apertures and the input/output components disposed therein may be covered by a thin, typically flexible waterproof material, such as plastic or rubber. Preferably, the speaker is waterproof and the microphone exterior is water-resistant. Additionally, all of the buttons, keys, or keypads on the exterior of the protective device 1 are typically waterproof or, at least, water-resistant.

The protective device 1 also carries electronics 50. The electronics contains a signal processor, such as a microprocessor or other computing device for communicating between the mobile terminal and the input/output components carried by the protective device 1. The signal processor may be capable of converting signals received by the input components carried by the housing to signals that the mobile terminal is capable of processing. The signal processor would then be capable of transmitting these converted signals from the protective device 1 to the mobile terminal therein. Additionally or alternatively, the signal processor may be capable of receiving signals from the mobile terminal secured within the housing. The signal processor could then convert these received signals to signals that the output components carried by the housing are capable of processing.

In one embodiment, the signal processor may communicate with the mobile terminal therein using radio frequency signals. In such an embodiment the signal processor would generally include an antenna for transmitting and/or receiving radio frequency signals to and/or from the mobile terminal secured within the housing. The signal processor may use BLUETOOTH wireless technology to communicate with the mobile terminal. BLUETOOTH is an open radio-frequency standard that enables cable-free voice and data communication between devices through short-range two- way radio (in the radio frequency range of 2.45 gigahertz). Many mobile electronic devices are already BLUETOOTH enabled.

In an alternative embodiment the mobile terminal may be hardwired to the protective device 1 so that the protective device 1 and the mobile terminal can communicate using electronic signals. The electronic connection between the mobile terminal and the signal processor can comprise an electrical wire, fiber optic cable, a pin, or a direct serial or parallel connection. It should be noted, however, that the present invention is not limited to any specific type of link or frequency for communicating between the signal processor and the mobile terminal secured within the housing. For example, in another embodiment of the present invention, beams of light, such as infrared waves, could also be used to communicate between the mobile terminal and the case components.

The present invention may also contain a power supply, such as a battery 51, carried by the protective device 1, for powering the case electronics and input/output components. In particular, the battery could be useful for providing power sufficient to amplify the output signals provided by the output component(s) so that the output signals are more perceptible in noisy, bright, dark, or other harsh environments. Additionally or alternatively, a battery carried by the protective device 1 could provide power to the mobile terminal secured within the protective device 1 so as to run the mobile terminal or extend the life of the mobile terminal battery. The protective device 1 may also contain a power port 52 for connecting a power cable for charging the case's battery 51 or powering the case electronics 50 and input/output components. The power port could be located inside the housing, as shown in FIG. 5, or the power port could be located on the exterior of the protective device 1. If located on the exterior of the protective device 1, the power port would preferably be waterproof or water-resistant like the other input/output components. For example, a removable rubber plug could be inserted into the port when the port is not in use.

In one advantageous embodiment of the present invention, the input/output components and the signal processor carried by the protective device 1 are removable from the protective device 1 while still being capable of communicating with the mobile terminal secured within the protective device 1. For example, in one embodiment of the present invention, a protective device 1 designed for a mobile phone has a removable speaker, microphone, and signal processor. The speaker, microphone, and signal processor form a wireless headset that can be used to communicate to the mobile terminal, both while secured within the protective housing and once the headset and the mobile terminal have been removed from the housing. In order to protect the mobile terminal and the headset, such as in instances in which the mobile terminal is to be used near water, the mobile terminal and the headset could be inserted into the protective housing and the protective housing sealed, with the microphone and speaker positioned within respective apertures defined by the protective device 1 so as to permit two-way communication with the user. Thereafter, the protective device 1 may be opened and the mobile terminal and the headset removed therefrom to permit use of the mobile terminal and the headset apart from the protective device 1 in a conventional manner. Such an embodiment would provide for a particularly economical protective device 1 by allowing the user to use a wireless headset both as a hands-free device and as input/output and electronic components of the protective device 1.

As was pointed out above, the mobile telephone is the most commonly used mobile terminal. In an alternative embodiment of the present invention among others, the protective device can be specifically designed for the mobile telephone. FIGS. 6 through 14 demonstrate such an example among many other possible scenarios.

Figures 6, 7:
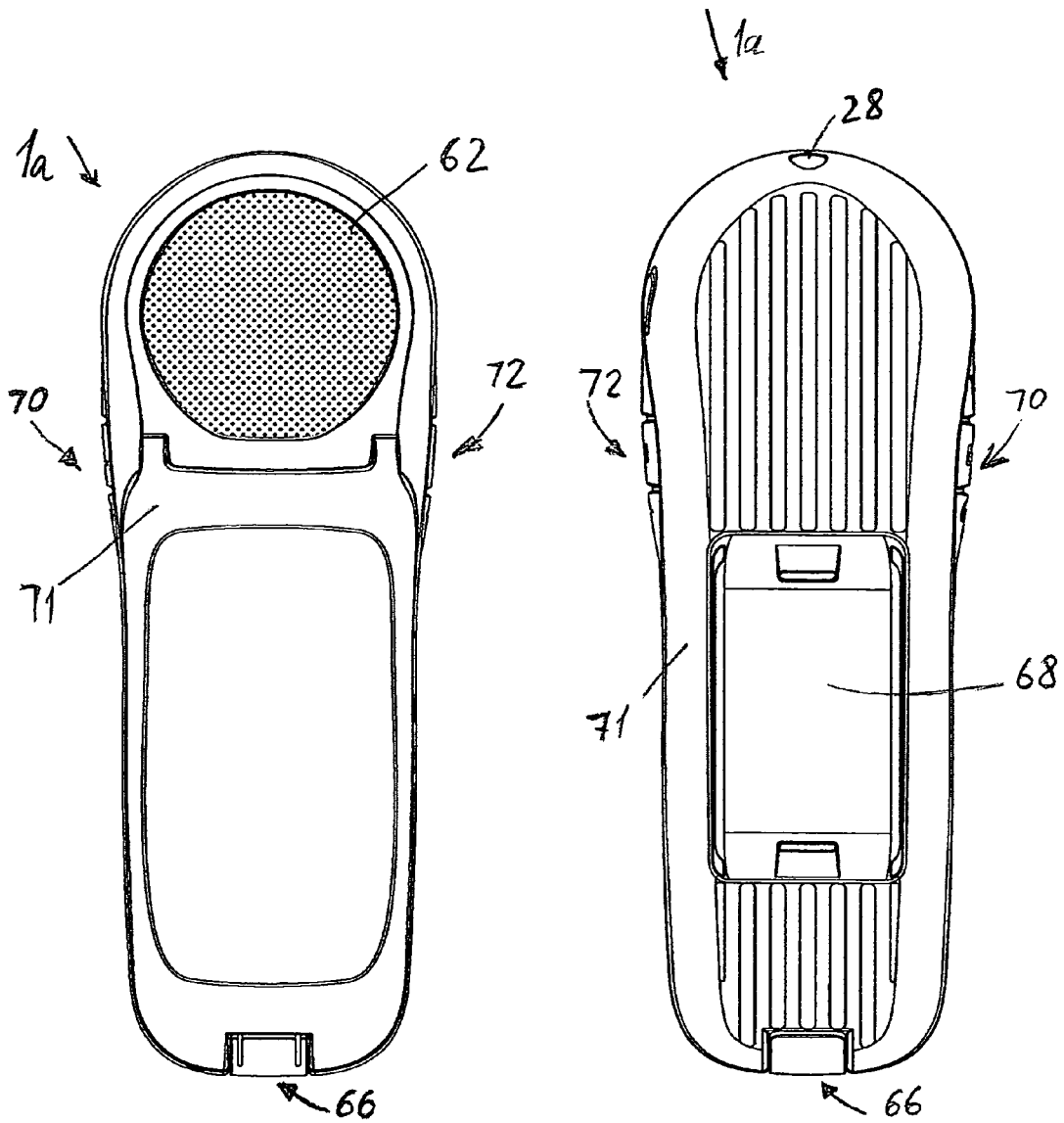
FIG. 6 is a front view of a mobile phone protective device, according to the present invention.
FIG. 7 is a back view of the device of FIG. 6, according to the present invention.

Referring first to FIG. 6, a splash and dust proof carrying case device (also called here a "protective device") 1a for a mobile phone is shown according to the present invention. A housing 71 of said protective device 1a has a built-in microphone and a speaker so that the mobile phone stored within the protective device 1a of FIG. 6 can be used as a hands-free device, particularly in an outdoor or harsh environment where splash and dust-proof protection is important. Thus the protective device 1a of FIG. 6 includes a loudspeaker (speaker) 62 as shown on the front view of FIG. 6. A lid 64 of said housing 71 can be opened by operating a latch mechanism 16 to expose a cavity within the device 1a for receiving a mobile phone and storing it within so with the lid 64 in the closed position as to provide the desired splash and dust protection.

FIG. 7 is a rear view of the protective device 1a and shows a mounting structure 68 which may be used for instance to insert the user's belt so as to enable the protective device 1a to be carried outdoors on the user's hip in a harsh environment where dust or splash protection is desired. The structure 68 will be shown in more detail below as will the lid 64 of FIG. 6 but it should be realized that other mounting structures and lid arrangements may be used in accordance with the present invention. For instance, the structure 68 may itself be a lid which could be used in an open position for insertion within a receptacle for securing the device 1a in a vehicle or bicycle or some such other vehicle within or on which the user is riding. The protective device 1a can be worn on the user's belt, could be easily mountable on a bike (using a special fixture similar to the device 68 but not shown in FIG. 7) or in a car and has a great merit for outdoor use.

Referring to both FIGS. 6 and 7, the profile of side push buttons 70 and 72 (build-in within housing 71) are shown along the edges of the protective device 1a and which are shown in more detail in FIGS. 8 and 9. FIG. 8 shows the push buttons 72 on the right hand side (from the top perspective of FIG. 6) of the protective device 1a. These may include telephony functions such as answering a telephone call or ending a telephone call (a send/end button 72b), increasing or decreasing the volume (buttons 72a and 72c), etc. A port 74 may be used for instance as a DC jack with cover. Another embodiment would be to turn on and turn off power to the protective device 1a which may be powered by batteries such as three AAA batteries. The push buttons 70 as shown in FIG. 9 may have various functions including those symbolically shown in the drawing i.e., from top to bottom: a flashlight 70a (for actuating a flashlight 78 shown in FIG. 11), PoC (push to talk over cellular) button 70b to a PTT (push to talk) feature and a privacy button 70c (to switch between a hands-free "speaker-phone" mode and a privacy mode where the protective device 1a has to be held up to the user's ear).

Figure 10:
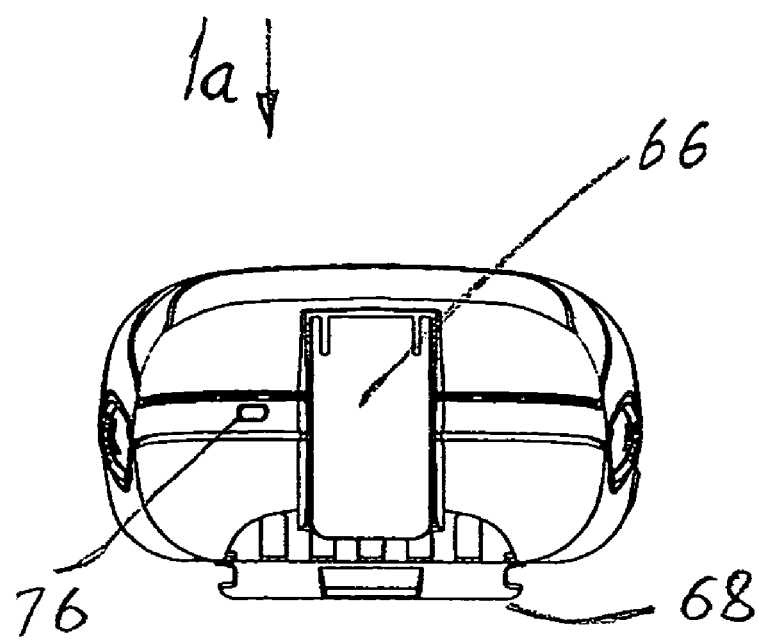
FIG. 10 is a bottom view of the device of FIGS. 6 and 7, according to the present invention.

FIG. 10 shows a bottom view of the protective device 1a in order to show the latch 66 which when operated will allow the lid 64 to open. A microphone 76 is also shown.

Figure 11:
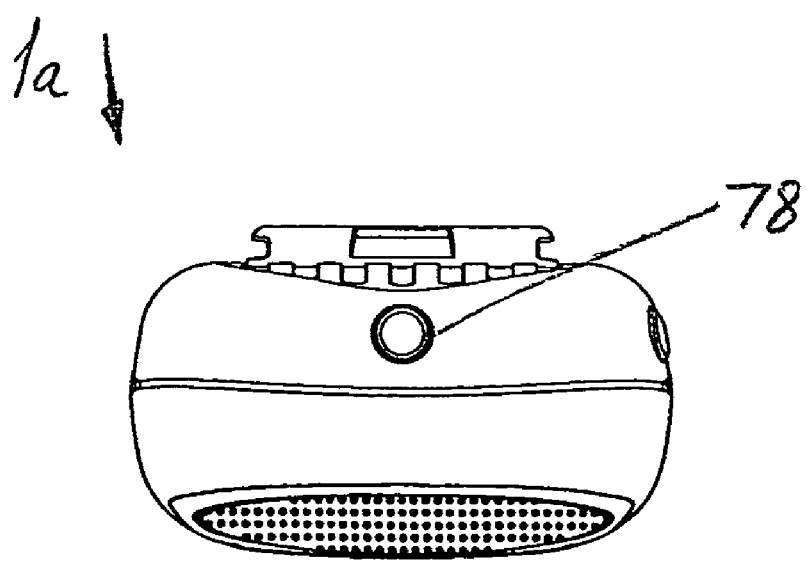
FIG. 11 is a top view of the device of FIGS. 6 and 7 with the flashlight feature shown, according to the present invention.

FIG. 11 shows the other end of the protective device 1a from the perspective of the flashlight 78 (build-in within housing 71) provided at that end of the protective device 1a and powered, e.g., by the batteries. The top push button 70a shown in FIG. 9 may be provided for controlling the flashlight 78 pressing the button 70a will turn the flashlight 78 on and pressing the button 70a again will turn the flashlight 78 off.

Figure 12:
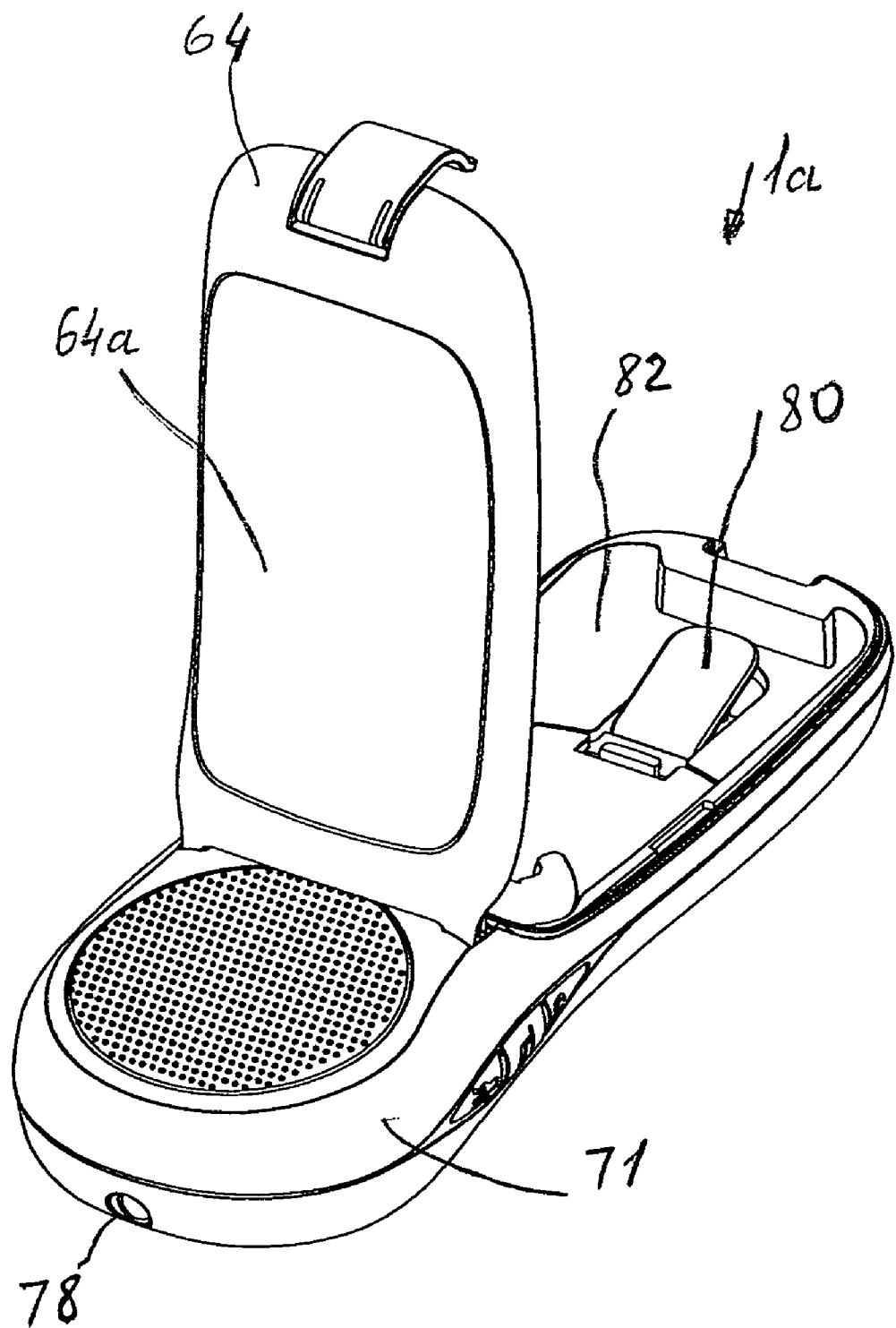
FIG. 12 shows a perspective view of the device of FIG. 11 with a lid in the open position and showing one end of the cavity in detail, according to the present invention.

FIG. 12 shows another perspective view of the device 1a with the lid 64 in an open position. In FIG. 12, the bottom portion of the cavity is shown in more detail, a spring loaded tongue mechanism 80 is shown in a raised position. When a mobile phone is inserted in the cavity 82, the tongue mechanism 80 is depressed and the phone held up against the lid in the closed position. Or, the phone could be slid under a lip on the edge of the cavity to hold the phone in place under the lip. One feature of the present invention can be to make the case or lid transparent or give it a "soft" cover so that the user can see through the cover and see the display and perhaps even access the keypad of the mobile phone (e.g., by pressing on the phone's keytop through the transparent window) through the soft cover. Such an embodiment is shown as a transparent window 64a of the lid 64 in FIG. 1 (said transparent window is also seen in FIGS. 6, 9 and 13).

Figure 13:
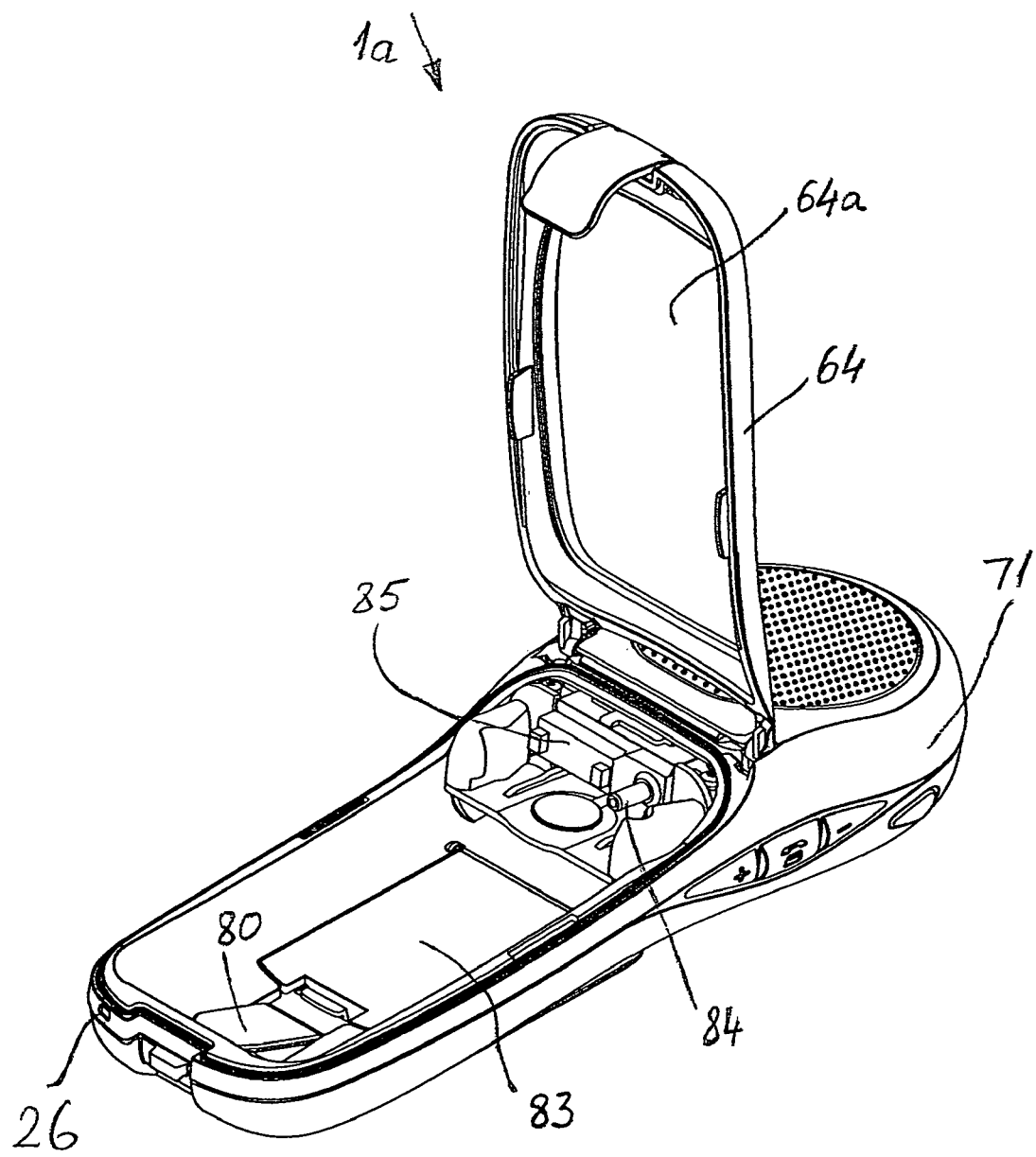
FIG. 13 shows another perspective view of the device of FIG. 11, top view showing the lid open and showing the other end of the cavity in detail, according to the present invention.

FIG. 13 shows yet another perspective view of the protective device 1a with the lid 64 in the open position, more particularly showing the top part of the cavity in perspective. A battery compartment resides below a battery compartment cover 82 within which a battery or multiple battery cells may be inserted. For instance, three AAA batteries may be aligned under the battery compartment cover 83 for supplying power to the protective device 1a including all of its internal components, such as the loud speaker and its amplifier, the microphone and its amplifier, etc. A cylindrical charging plug connector 84 is shown extending into the cavity for connection to a receptacle on the mobile phone. This connector or plug 84 may convey information and/or power to the protective device 1a for the purposes of its various functions such as receiving voice as spoken into the microphone or amplifying an incoming audio signal for output on the speaker 62. Underneath the top of the speaker grill there may be provided a red LED (not shown in FIG. 13) to indicate a low battery condition. As seen from FIG. 13, the cavity of the protective device 1a might include a PopPort connector 73 for connecting signals of the mobile telephone to the protective device 1a and vice versa.

Figure 14:
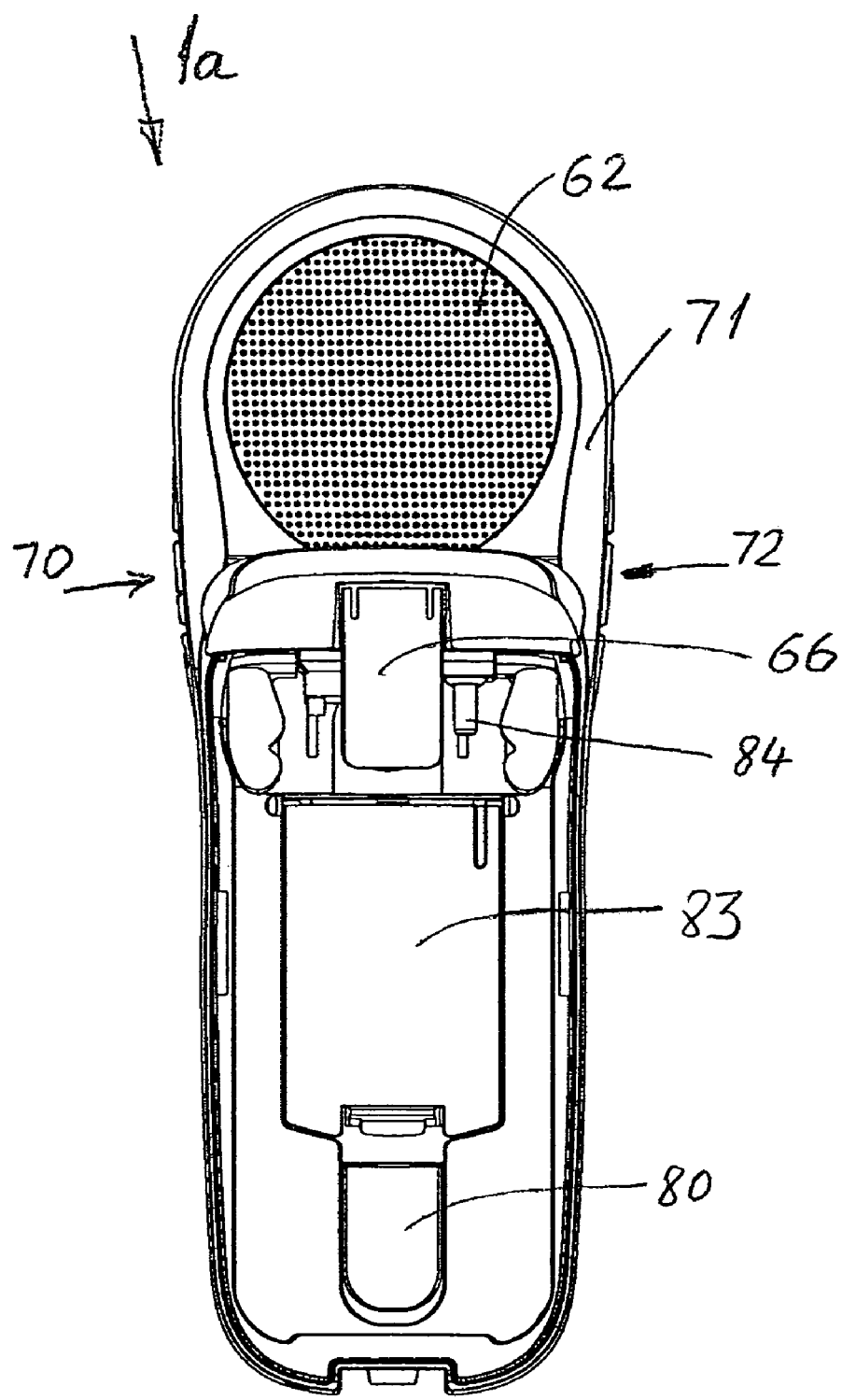
FIG. 14 shows a top perspective view looking down on the device of FIG. 11 with the lid open and showing the entire cavity in detail, according to the present invention.

FIG. 14 shows yet another view of the protective device 1a from the same perspective as FIG. 6 except with the lid 64 in an open position and with the cavity shown in full top view.

Regarding the battery compartment shown in FIGS. 13 and 14, it is realized that the protective device 1a of the present invention described in FIGS. 6-14 is powered by batteries and the battery compartment is under the phone compartment having it's own door shown as the battery compartment cover 82. There is a clear indication about the battery polarities within the battery compartment for the user to put in the batteries. It will of course be understood that the device of the present invention in a preferred embodiment is not powered by the mobile telephone inserted within but is powered by its own batteries or by an external DC power source, e.g., inserted into the DC jack 74.

The protective device of the present invention shown in FIGS. 6 through 14 provides a useful device for persons enjoying outdoor activities who want to use their mobile telephones in such environments while at the same time possibly listening to radio/music while outdoors together with friends or family or in situations where there is a need to have one's hands-free, but in which use of a headset is not desired. The device of the present invention can be used for basic call handling such as answering an incoming call, ending a call, setting the volume level. A built-in microphone and speaker allows the user to use the device in a hands-free manner or to share voice call communications with other people.

The protective device 1a of the present invention shown in FIGS. 6 through 14 may be made of materials and use mechanisms to protect the phone against splash and dust. These materials can be waterproof or alternatively can be not necessarily completely waterproof but enough to protect against water splash and dust. The protective device 1a is suitable for outdoor activity and acts as a carrying case for the phone.

The weight of the protective device 1a can be made very light, for instance on the order of 160 grams excluding fixtures and without batteries. The length might be on the order of 200 millimeters and its width e.g. around 70 millimeters. A good thickness might be 42 millimeters for example. With suitable battery power an operation time of 4½ hours would be suitable but this can of course vary depending on availability of batteries, weight, size, etc. An operating temperature of −30 degrees C. to +70 degrees C. would be appropriate.

The device's own operation voltage can be regulated from the battery voltage. When the protective device 1a is connected to the phone without a battery, the phone will not recognize the accessory. After the batteries are inserted in the device 1a will be recognized as a hand-free device. In case the battery becomes drained, the main-parts of the electronics are switched off and the connection to the phone is disabled. When the protective device 1a is recognized and is operating, the user can adjust the speaker volume by the up and down button 72c and 72a. While making a call, using a tuner or MP3-playback-function the uplink and downlink will be established, otherwise all the amplifiers in the protective device 1a are muted or in a shutdown mode.

A built-in FM-antenna (not shown in FIGS. 6-14) may allow one to use a tuner-function of phones through the speaker, i.e., without earphones. The protective device 1a will provide hands-free audio with good quality and the unit is easy to install and be removed by the end-user.

A short description of usage of the phone with the protective device 1a presented in FIGS. 6-14 will now follow and it is to be understood that in order to carry out the functions it requires that the phone be powered on already and the phone must be connected to the protective device 1a of the present invention, e.g., through the Pop-Port connector 85 shown in FIG. 13 and described in detail below.

To answer a call, where automatic call answering is disabled, the user will see the incoming call information on the phone display through the transparent window 64a. The user can press the send/end button 72b on the outside of the case to pick up the call. The user can also press on the phone's keypad through the transparent window 64a. The carrying case device of the present invention will then provide hands-free service. Of course, if automatic call answering is enabled, there is no need to press any key and the call is picked up automatically. To end a call, a user can press the send/end button 72b. If the phone supports voice dialing, the user can hold the send/end button 72b to initiate voice dialing. This serves as a short cut to initiate voice dialing, and the user can follow normal voice dialing procedures, thus providing hands-free service. The volume up and down buttons 72c and 72c, respectively control the audio gain of the carrying case only, which means it only increases the volume of the speaker 62 and does not effect the volume setting in the mobile phone itself.

If a user is listening to the radio, pressing the send/end button 72b once will change the radio to the next preset radio channel. The skipping is done in the circular way and if it has reached the end of the preset radio channel list, it will loop back to the first one on the list. If the user has not saved any radio channel, a default channel frequency will be used. To skip to a next music track if a user is listening to the music player, pressing the send/end button 72b once will skip the music to the next track. The skipping is done in a circular way and if it has reached the end of the music track list, it will loop back to the first one in the list. The skipping only has effect when there is more than one music track.

Whenever the carrying case 1a of the present invention is connected with a phone in use, it will provide a hands-free feature, and the audio can be heard within an open area. Sometimes the user might want to have a private conversation and a privacy mode can be selected or deselected by pressing the privacy button 70c shown in FIG. 9. The user will hold the carrying case 1a close to the ear instead of taking it out of the phone compartment. In the privacy mode the audio gain for the speaker 62 is reduced, meaning that only the speaker 62 is reduced and the volume setting in the phone itself is not affected at all. The speaker volume will escalate in 5 seconds from the privacy mode to the normal hands-free to avoid damage to the ear.

The phone can be charged even if it is connected to the protective device 1a of the present invention. There is a DC jack 74 provided on the side of the protective device 1a as shown in FIG. 8 to plug in the normal phone charger. The DC connector is connected internally to the Pop-Port connection area in the phone compartment 82 of the protective case 1a. Charging of the phone is independent of other operations with the phone. The charging status of the phone is reflected on the phone display.

The Pop-Port connector 85 is a primary interface connector for use particularly in future phones. It has been designed for the mobile environment and supports advance functionalities such as digital accessory identification, stereo audio or fast data connectivity with compatible devices. Pop-Port (TM) is a trademark of the Assignee hereof. The main functionalities of the Pop-Port connector 85 are: digital enhancement identification, stereo audio, fast data connectivity, power output for enhancement. ("Power output support" means enhancements can utilize the phone's battery). Some of the mechanical properties of the Pop-Port connector 85 are different from current interfaces. The charger connector interfaces are the same as the current Nokia 3.5 millimeter DC plug.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A protective device for use with a mobile phone, comprising:
 a housing for a mobile phone within which the mobile phone is insertable and protected against water splash and dust when said housing is in a closed position; and a microphone and a speaker built-in to said housing to enable hands-free operation of the mobile phone when inserted in said housing, wherein the protective device is configured to switch said mobile phone inserted into said protective device between a hands-free operation utilizing said speaker of the protective device and a privacy mode with a reduced auto gain of the speaker.

2. The protective device of the claim 1, wherein said housing has a transparent window configured for actuating at least one key of said mobile phone inserted into said protective device by pressing said at least one key through said transparent window.

3. The protective device of the claim 1, wherein the protective device comprises a jack port configured to electrically charge said mobile phone inserted into said protective device without interrupting a normal operation of the mobile phone.

4. The protective device of the claim 1, wherein said protective device is configured to actuate at least one operational function of said mobile phone inserted into said protective device using at least one corresponding button or at least one key of said protective device.

5. The protective device of the claim 1, wherein said protective device comprises a build-in flashlight.

6. The protective device of the claim 1, wherein the protective device comprises an electrical connector configured to connect to said mobile phone inserted into said protective device.

* * * * *

UNITED STATES PATENT AND TRADEMARK OFFICE
CERTIFICATE OF CORRECTION

PATENT NO. : 7,400,917 B2 Page 1 of 1
APPLICATION NO. : 11/046556
DATED : July 15, 2008
INVENTOR(S) : Joseph Wood et al.

It is certified that error appears in the above-identified patent and that said Letters Patent is hereby corrected as shown below:

In column 1, line 9, "from" should be deleted.
In column 1, line 9, --is a continuation-in-part of-- should be inserted after "and".

Signed and Sealed this

Seventh Day of July, 2009

JOHN DOLL
*Acting Director of the United States Patent and Trademark Office*